United States Patent
Capone et al.

(10) Patent No.: US 8,561,398 B2
(45) Date of Patent: Oct. 22, 2013

(54) FLUID-BASED POWER GENERATION SYSTEM

(75) Inventors: Richard Capone, Palm Beach Gardens, FL (US); Michael Murgio, West Palm Beach, FL (US); Eddy Delrio, West Palm Beach, FL (US)

(73) Assignee: Florida Renewable Energy Corporation, Riviera Beach, FL (US)

( * ) Notice: Subject to any disclaimer, the term of this patent is extended or adjusted under 35 U.S.C. 154(b) by 762 days.

(21) Appl. No.: 12/773,620

(22) Filed: May 4, 2010

(65) Prior Publication Data

US 2010/0283250 A1     Nov. 11, 2010

Related U.S. Application Data

(60) Provisional application No. 61/175,491, filed on May 5, 2009.

(51) Int. Cl.
    *F16D 31/02*     (2006.01)

(52) U.S. Cl.
    USPC ............................................................ 60/398

(58) Field of Classification Search
    USPC ................... 60/398, 495, 496, 505, 499, 502;
                                  290/43, 54; 416/8; 415/92
    See application file for complete search history.

(56) References Cited

U.S. PATENT DOCUMENTS

| | | | | |
|---|---|---|---|---|
| 308,544 | A | * | 11/1884 | Yagn .................................. 416/8 |
| 629,250 | A | | 7/1899 | Henretty |
| 1,645,486 | A | * | 10/1927 | Hardcastle ......................... 416/8 |
| 1,744,982 | A | * | 1/1930 | Merrick ............................. 416/8 |
| 1,751,513 | A | * | 3/1930 | Gaede ................................ 415/5 |
| 3,882,320 | A | * | 5/1975 | Schmeller ........................ 290/43 |
| 3,887,817 | A | | 6/1975 | Steelman |
| 3,992,125 | A | | 11/1976 | Schilling |
| 4,124,182 | A | | 11/1978 | Loeb |
| 4,364,709 | A | | 12/1982 | Tornquist |

(Continued)

FOREIGN PATENT DOCUMENTS

| | | |
|---|---|---|
| JP | 2008-255886 | 10/2008 |
| SU | 1295024 A * | 3/1987 |
| SU | 1295024 | 7/1987 |

OTHER PUBLICATIONS

International Search Report mailed on Jan. 3, 2011 in International Application No. PCT/US2010/033586, International filed: May 4, 2010. (3 pages).

*Primary Examiner* — Edward Look
*Assistant Examiner* — Logan Kraft
(74) *Attorney, Agent, or Firm* — Novak Druce Connolly Bove + Quigg LLP

(57) ABSTRACT

A power generating system operates in a flowing body of fluid, such as water or air. The system includes a continuous loop member engaging and rotating around two rotatable members, which, in turn, are operatively connected to a generator. The continuous loop member can include a plurality of attachment arms that extend outwardly therefrom. A collapsible fluid catchment device can be attached to each attachment arm. The fluid catchment devices can open in the direction of movement of the water thereby driving the continuous loop member and, consequently, the rotatable members. When moving against the fluid flow, the catchment devices can collapse to a closed position to thereby reduce drag. The attachment arms are long enough so that the catchment devices are spaced a sufficient distance from the continuous loop member to prevent contact with the rotatable members and the continuous loop member when the catchment devices are fully open.

21 Claims, 13 Drawing Sheets

(56) References Cited

U.S. PATENT DOCUMENTS

| | | | |
|---|---|---|---|
| 4,859,146 A | 8/1989 | Labrador | |
| 5,460,556 A * | 10/1995 | Logan et al. | 441/2 |
| 6,072,245 A | 6/2000 | Ockels | |
| 6,254,034 B1 | 7/2001 | Carpenter | |
| 6,498,402 B2 * | 12/2002 | Saiz | 290/55 |
| 6,523,781 B2 | 2/2003 | Ragner | |
| 6,555,931 B2 | 4/2003 | Mizzi | |
| 6,809,430 B2 | 10/2004 | Diederich | |
| 7,275,719 B2 | 10/2007 | Olson | |
| 7,504,741 B2 | 3/2009 | Wrage et al. | |
| 2008/0303285 A1 | 12/2008 | Bondhus | |
| 2009/0167028 A1 | 7/2009 | Akamine | |
| 2010/0127501 A1 * | 5/2010 | Steelman | 290/54 |

* cited by examiner

FLUID-BASED POWER GENERATION SYSTEM

CROSS-REFERENCE TO RELATED APPLICATIONS

This application claims the benefit of U.S. Provisional Application No. 61/175,491, filed on May 5, 2009, which is incorporated herein by reference in its entirety.

FIELD

Embodiments relate generally to electrical energy power plants and, more specifically, to power plants operating in a moving fluid.

BACKGROUND

Many present day energy generation systems have undesirable consequences, such as pollution in the case of fossil fuel based systems and radioactive waste in nuclear fuel based systems. The general idea of harnessing energy from natural sources, such as the flow of a fluid like water or air, has been known for centuries and is highly desired for being abundant and clean. Various prior systems have been directed to generating energy from natural sources; however, they all have inherent design features that render them ineffective and/or inefficient.

For instance, U.S. Pat. No. 3,887,817 to Steelman is directed to a power generating device. This device has a continuous flexible member that is trained about a single pulley. A plurality of sails is attached to the flexible member. A plurality of lines is attached around the open end of the sails and to the flexible member. The flexible member passes through the geometric center of each sail. Because of this design, when the sails reach the pulley, the sail will be compressed between the pulley and the flexible member, which will result in multiple negative consequences. For instance, there is a high likelihood that the sail will become entangled in the pulley as it rotates around the pulley. In such case, the rotation of the pulley may stop such that the device ceases to function as designed, or the sail may be torn, thereby rendering the sail inoperative. Moreover, if somehow these adverse consequences do not occur, the constant pressure as the sail passes over the pulley will cause the sail to wear out at a very fast rate, requiring its replacement in a relatively short period of time.

Further, all of the clips and buoyancy correcting members have the flexible member running through the center of them. As a result, they will also be passing over the pulley, which will not only cause them to wear out quickly but will also create excessive wear on the pulley and will most likely induce slippage of the flexible member, thereby reducing efficiency. Additionally, the device also makes use of only one pulley. Although a single pulley reduces the overall weight of the device, it makes the likelihood of consistent operation highly unlikely. Due to a lack of a second pulley, buoyancy correcting members are used to keep the flexible member from either sinking or floating. As the flexible member reaches the end at the pulley, where it now needs to turn downward to begin its path against the current, the buoyancy correcting member will not allow the rope to sink to a lower depth. As a result, all of the flexible members will be at the same level and will most likely cause an entanglement of the flexible member and sails.

U.S. Pat. No. 6,498,402 to Saiz is directed to a wind energy catchment device. The device uses parachutes. Although the Saiz device uses two or more pulleys, the parachutes will still pass over the pulleys, and the device will experience the same negative consequences associated with the Steelman device.

U.S. Pat. No. 3,992,125 to Schilling is directed to an underwater power apparatus with furlable sails as working members. Schilling discloses the use of a vertical flat sail to capture the energy. Thus, the Schilling apparatus has many more movable parts that will inherently make it less efficient and prone to breakdown and maintenance issues. It also requires it be mounted on the sea or river bed. This makes deployment and maintenance more difficult, especially if the depth is extreme.

Thus, there is a need for a fluid-based energy generation system that can minimize such concerns.

SUMMARY

A power generating system includes a continuous loop member, a forward rotatable member that supports a portion of the loop member and an aft rotatable member that supports another portion of the loop member. A plurality of attachment arms is distributed along the loop member. Each attachment arm has a proximal end attached to the loop member and extends outwardly from the loop member to a distal end.

The system also includes a plurality of fluid catchment devices. Each catchment device is operatively connected to a respective one of the attachment arms or the support rods. As a result, each catchment device is spaced from the loop member. Each catchment device includes an open position and a closed position. The system operates within a moving fluid, such as air or water. The catchment device can react with a fluid flow to open in the direction of the fluid flow to thereby transmit energy from the fluid flow to drive the loop member. The catchment devices can collapse to the closed position in the direction opposite to the fluid flow to significantly reduce drag.

The system can further include a support rod. One end of the support rod can be connected to a distal end region of the attachment arm and can extend therefrom to another end. The other end of the support rod can engage a portion of a respective one of the catchment devices. In one embodiment, the catchment devices can be parachutes. Each parachute can have a canopy. A plurality of connectors, such as, for example, cords, cables or ties, can be attached to and extend from an end of the canopy. The connectors can be further attached to the attachment arm and/or the support rod. The support rod can be attached to a central portion of the parachute canopy.

Each attachment arm can have a length such that, when the catchment devices are in the open position, the catchment devices do not contact the loop member. The plurality of attachment arms can be distributed along the entire length of the loop member. At least one of the rotatable members can be supported by operative connection to a barge. At least one of the rotatable members can be supported by a buoyant member, such as a buoy. A generator can be housed within the buoyant member. The buoyant member can have variable buoyancy. At least a portion of the system can be supported by a buoyant member.

At least a portion of the system can be operatively connected to a shaft. The shaft can be oriented in a substantially vertical direction. The system can be rotatable about the shaft and/or vertically movable along the shaft The forward rotatable member can be operatively connected to an electric generator. The motion of the forward rotatable member can be transmitted to the electric generator to produce electrical energy. The aft rotatable member can be operatively connected to an electric generator. The motion of the aft rotatable member can be transmitted to the electric generator to produce electrical energy.

The forward rotatable member can have an associated axis of rotation, and the aft rotatable member can have an associated axis of rotation. In one embodiment, the axes of rotatable members can be substantially horizontal. In another embodiment, the axes of rotatable members can be substantially vertical.

In one embodiment, at least one of the catchment devices can be configured as a parachute. In another embodiment, at least one of the catchment devices can be configured as a clam shell. Combinations of these and other catchment device configurations are possible.

A first subset of the plurality of attachment arms can have an associated first length. A second subset of the plurality of attachment arms can have an associated second length. The first length can be different from the second length. The attachment arms can be arranged such that attachment arms of the first length alternate with attachment arms of the second length along the loop member.

One or more of the attachment arms can include a first member. The first member can have a proximal end attached to the loop member and can extend substantially perpendicular therefrom in a section of the loop member between the forward and at rotatable members. The first member can have a distal end. The attachment arms may also include a second member. The first member can have a proximal end attached to the loop member and a distal end attached to a portion of the first member, such as at or near the distal end of the first member. The second member can provide support to the first member against bending.

In another respect, embodiments are directed to a power generating system. The system can include a first system and a second system. The first and second systems can each include a continuous loop member, a forward rotatable member that supports a portion of the loop member, and an aft rotatable member that supports another portion of the loop member. A plurality of attachment arms is distributed along the loop member. Each attachment arm has a proximal end attached to the loop member. Each attachment arm extends outwardly from the attachment arm to a distal end.

The system further includes a plurality of fluid catchment devices. Each catchment device being operatively connected to a respective one of the attachment al us or the support rods such that each catchment device is spaced from the loop member the catchment device including an open position and a closed position, whereby the catchment device reacts with a fluid flow to open in the direction of the fluid flow to thereby transmit energy from the fluid flow to drive the continuous chain, and whereby the catchment devices collapse to the closed position in the direction opposite to the fluid flow to significantly reduce drag.

The first and second systems can be disposed at the same vertical elevation or at different vertical elevations. In one embodiment, the first and second systems can be substantially parallel to each other. In another embodiment, the first and second systems are arranged in a substantially v-shaped configuration. In such case, the forward rotatable member of the first system can be operatively connected to the forward rotatable member of the second system. The forward rotatable member of the first system can rotate in a direction that is opposite to the direction of rotation of the forward rotatable member of the second system.

DETAILED DESCRIPTION

Figure 1:
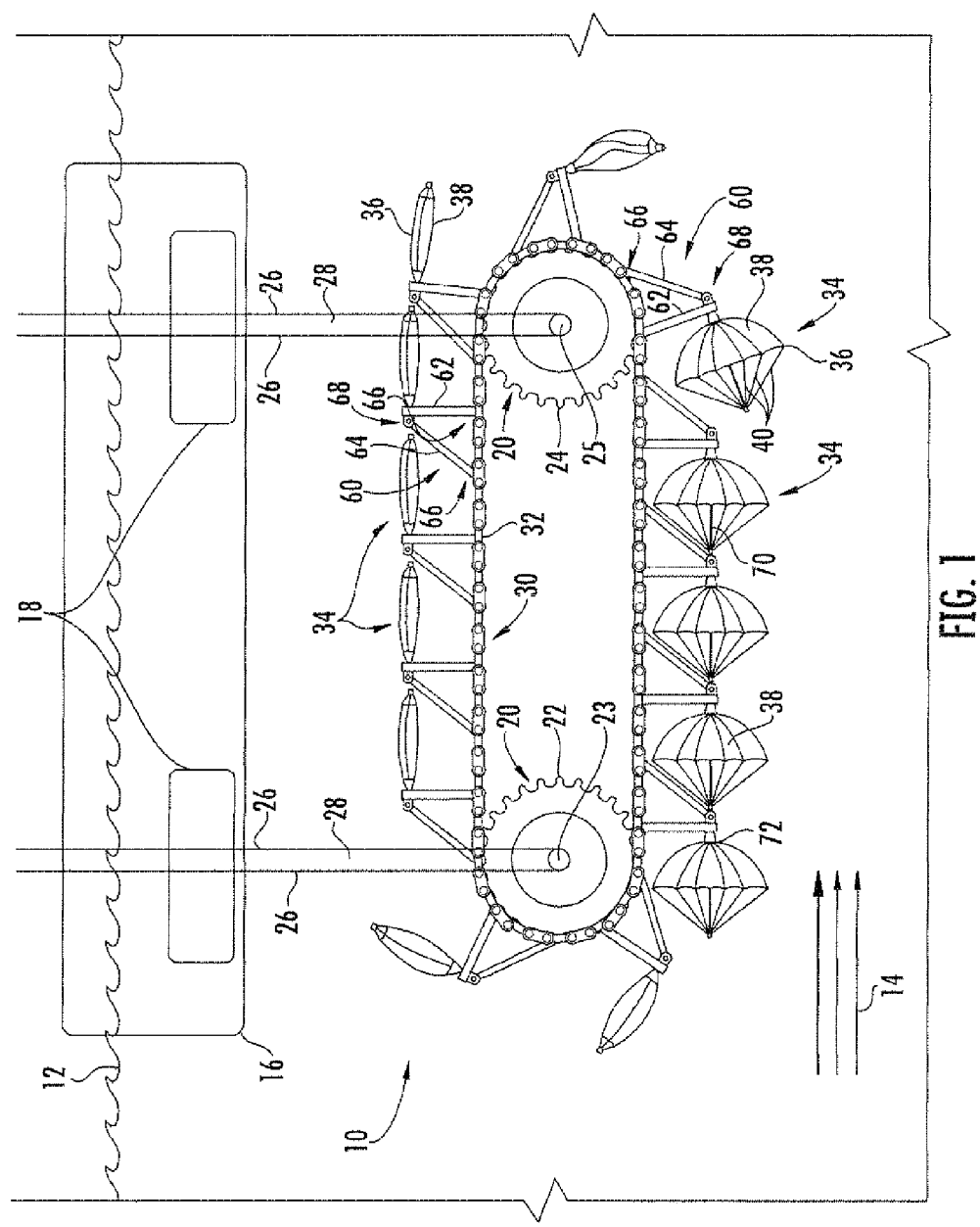
FIG. 1 is a side elevation view of a fluid-based power generation system.

Embodiments are directed to systems for harnessing the energy in fluid flows. Embodiments will be explained in connection with various possible arrangements of a water-based power generation system, but the detailed description is intended only as exemplary. Indeed, it will be appreciated that embodiments can be applied in connection with other types of fluid flows, such as air.

Embodiments are shown in FIGS. 1-15, but embodiments are not limited to the illustrated structure or application. Further, like reference numerals are used throughout the figures to designate similar or equivalent elements. The figures are not drawn to scale and they are provided merely to illustrate the embodiments described herein.

Referring to FIG. 1, a fluid-based power generation system 10 is shown. The system 10 can be used in any flowing fluid. For example, the fluid can be a body of water 12, such as the Gulf Stream or a river, which has an associated flow 14.

The system 10 can be supported in the flowing body of water 12 by a support structure. The support structure can be buoyant, such as a barge 16. The system 10 can include one or more electric generators 18. The electric generators 18 can be provided on the barge 16. In one embodiment, the electric generators 18 can be provided in a hermetically sealed compartment of the barge 16 and/or the generators 18 themselves can be adapted for underwater usage. Alternatively, the generators 18 can be located on land, such as on a land-based fixed provided on a shoreline or banks of an inlet. The generators 18 can also be located on an offshore platform, such as an oil drilling platform.

Figure 2:
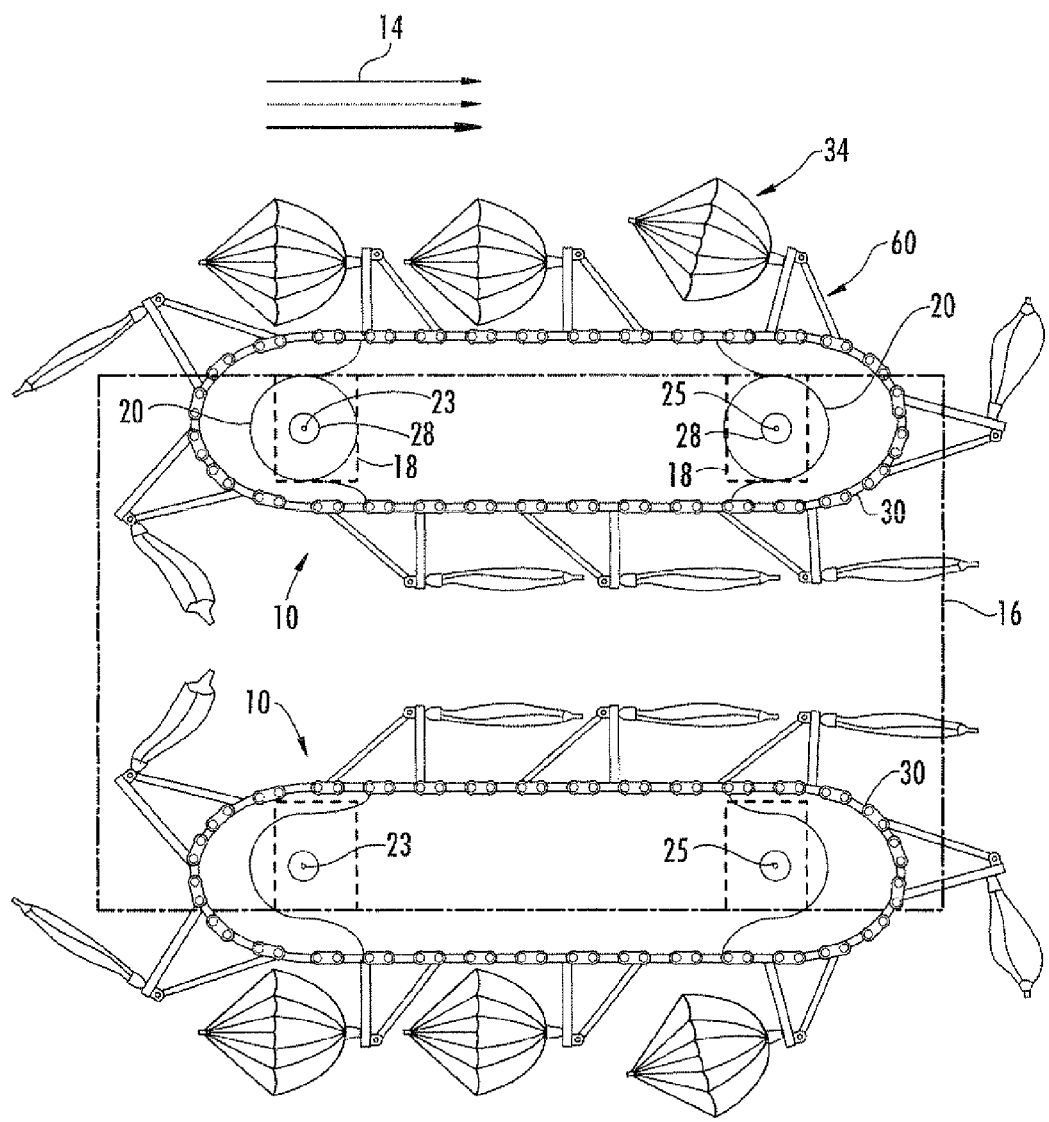
FIG. 2 is a top plan view of a fluid-based power generation system, showing a configuration in which a plurality of systems is arranged in a parallel configuration.
Figure 13:
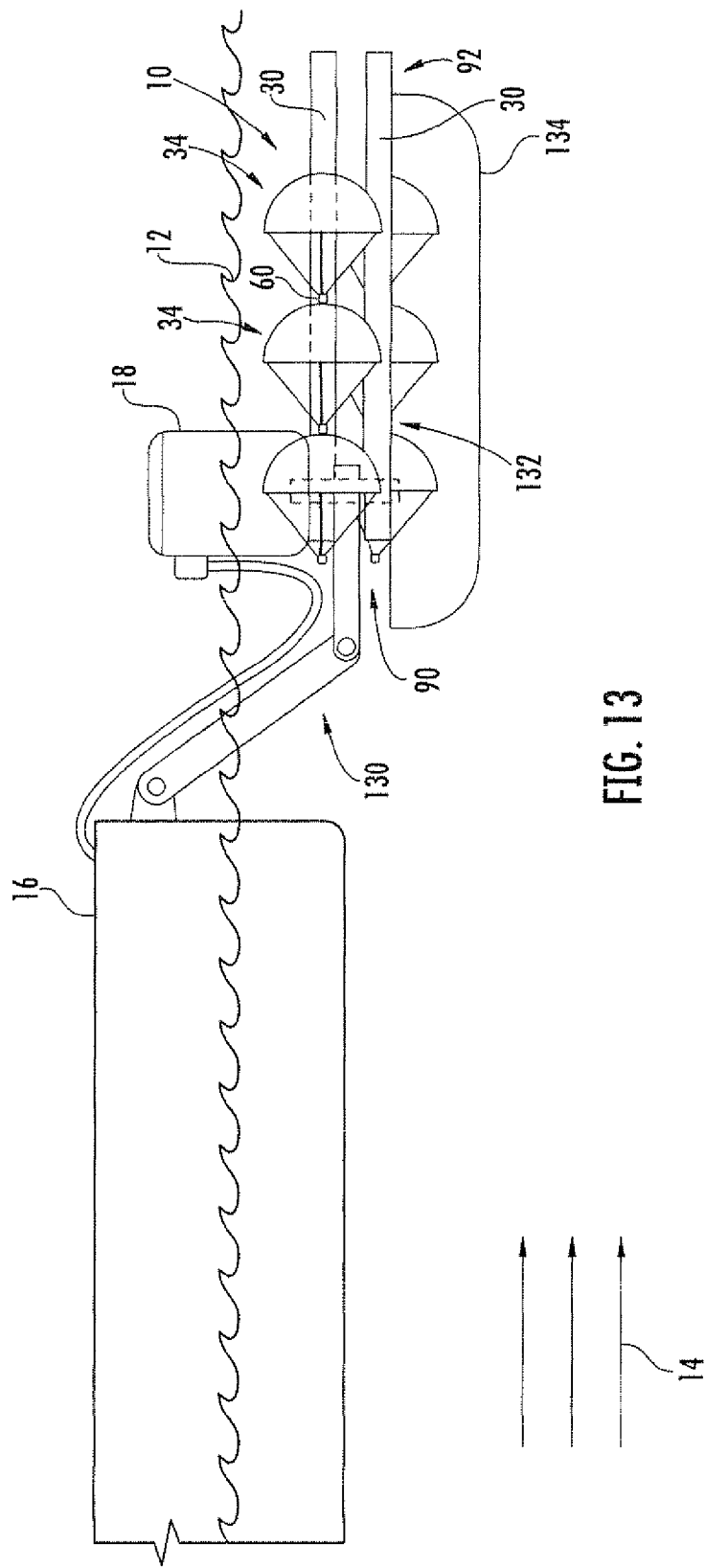
FIG. 13 is a side elevation view a fluid-based power generation system, showing the system being deployed off of a barge and an underside of the system being supported by a buoyant member.

The system 10 can further include a plurality of rotatable members. The rotatable members can be any suitable structure. For instance, the rotatable members can be pulleys, sprockets 20, gears, drums or drive wheels, or combinations thereof. There can be a forward rotatable member 22 and an aft rotatable member 24 relative to the direction of flow. The forward rotatable member 22 can have an associated axis of rotation 23, and the aft rotatable member 24 can have an associated axis of rotation 25. In one embodiment, the system 10 can be arranged such that the axes of rotation 23, 25 can be oriented substantially horizontally, as is shown in FIGS. 1, 3, 4, 7 and 14. The term "substantially horizontally" means true horizontal and slight variations therefrom. In another embodiment, the system 10 can be arranged such that the axes of rotation 23, 25 can be oriented substantially vertically, as is shown in FIGS. 2, 13 and 15. The term "substantially vertically" means true vertical and slight variations therefrom.

The rotatable members 22, 24 can be supported in the body of water 12 by lowering members 26, which can be beams, rods, bars or tubes, just to name a few possibilities. The lowering members 26 can be any suitable structure for keeping the system 10 at depth in the body of water 12. The lowering members 26 can be hollow. The lowering members 26 can be rigid.

The lowering members 26 can be used to connect each of the rotatable members 22, 24 to a support structure, such as the barge 16. There can be any number of lowering members 26 associated with each rotatable member 22, 24. The lowering members 26 can be attached to a support structure, such as the barge 16, in any suitable manner. For instance, the lowering members 26 can be mechanically attached to the barge 16 or any other platform via cross bracing or other suitable means.

The rotatable members 22, 24 can be operatively connected to the generators 18 such that the rotation of the rotatable members 22, 24 is transferred thereto. For instance, the rotatable members 22, 24 can be operatively connected to the generators 18 by way of a drive shaft 28. In one embodiment, the drive shaft 28 can be encased within the lowering members 26. A portion of each drive shaft 28 can be operatively connected to one of the rotatable members 22, 24. More particularly, a portion of each drive shaft 28 can be rotatably connected to one of the rotatable members 22, 24. In one embodiment, the rotatable members 22, 24 can be connected to the drive shaft 28 by, for example, a sliding spline drive, a slip joint or other suitable means. Likewise, another portion of each drive shaft 28 can operatively engage a respective one of the electric generators 18. More particularly, a portion of each drive shaft 28 can be rotatably connected to one or more of the electric generators 18. In one embodiment, the drive shaft 28 can be connected to the generators 18 by a sliding spline drive, a slip joint or other suitable means.

The system 10 can further include a continuous loop member 30. The loop member 30 can be supported by the rotatable members 22, 24. The loop member 30 can operatively engage the rotational members 22, 24 such that the loop member 30 can rotate the rotational members 22, 24. The loop member 30 can be any suitable structure. For instance, the loop member 30 can be a chain 32, a chain-like device, a cable or a drive belt, just to name a few possibilities. The loop member 30 can be a single continuous structure, or it can be made of a plurality of segments that are joined or connected together. The loop member 30 can be flexible.

A plurality of fluid catchment devices 34 can be attached to the loop member 30 to react with the fluid flow 14. The plurality of fluid catchment devices 34 can be distributed along the loop member 30 in any suitable manner. For instance, the fluid catchment devices 34 can be substantially equally spaced along the continuous loop member 30. Any suitable quantity of catchment devices 34 can be used. The plurality of fluid catchment devices 34 can be substantially identical to each other, or at least one of the catchment devices 34 can be different from other catchment devices 34 in at least one respect.

The fluid catchment devices 34 are collapsible. That is, the catchment devices 34 can have an open configuration and a closed configuration. The catchment devices 34 can have any suitable form. For instance, the catchment devices 34 can be in the form of parachutes 36, as is shown in FIGS. 1-8 and 13-15. In such case, the catchment devices 34 can include a parachute canopy 38 and a plurality of elongated connectors, such as cords 40, can extend therefrom. The canopy body 38 of the catchment devices 34 can be made of a strong and durable cloth-like material. For instance, the canopy body 38 can be made of high strength fibrous materials such as carbon fibers. The canopy body 38 can have any suitable size.

The catchment devices 34 can be attached to the continuous loop member 30 in any suitable manner, including direct and indirect manners of attachment. In one embodiment, the catchment devices 34 can be indirectly attached to the loop member 30 by an attachment arm 60. The attachment arm 60 can have any suitable configuration. The attachment arm 60 can be a rigid structure.

Figure 5:
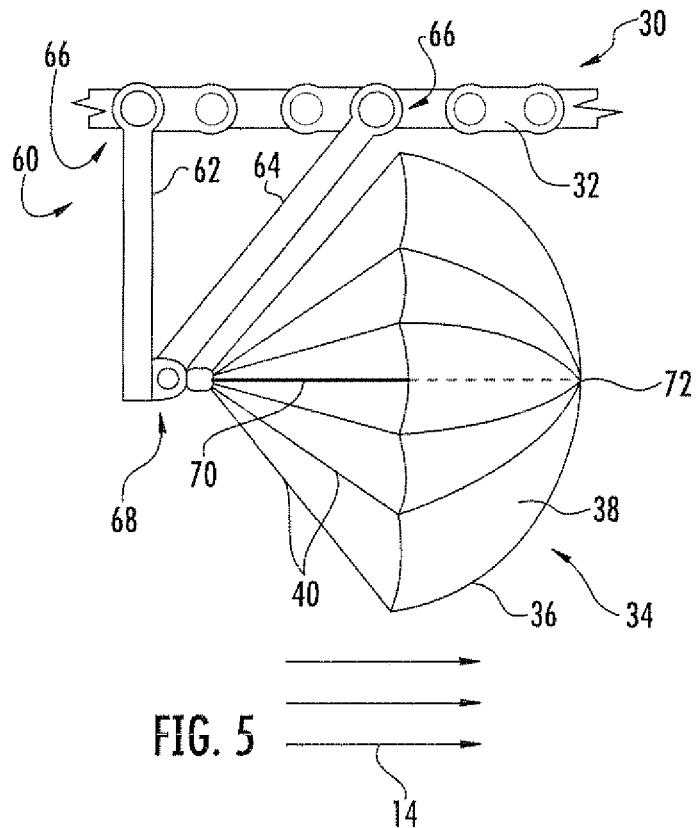
FIG. 5 is a side elevation view of a portion of a fluid-based power generation system, showing a catchment device in a trailing configuration.

FIG. 5 shows one example of an attachment arm 60. Each attachment arm 60 can include a first member 62 and a second member 64 that can connect between the continuous loop member 30 and the catchment device 34. Each of the first and second members 62, 64 can have a proximal end 66 and a distal end 68. The proximal end 66 of the first member 62 can be attached to the continuous loop member 30 and can extend substantially perpendicularly outward therefrom. Each of the first and second members 62, 64 can move relative to each other. The proximal end 66 of the second member 64 can be attached to the continuous loop member 30 and can extend outwardly various angles as required as it rotates around the rotatable members 22, 24. In one embodiment, the second member 64 can extend at about 45 degrees relative to the continuous loop member 30. The distal end 68 of the first member 62 and the distal end 68 of the second member 64 can be attached together but remain articulating. The second member 64 can support the first member 62 and can prevent the first member 62 from bending toward the continuous loop member 30 due to the high force developed from the flow 14 reacting against the fluid catchment device 34.

Figure 6:
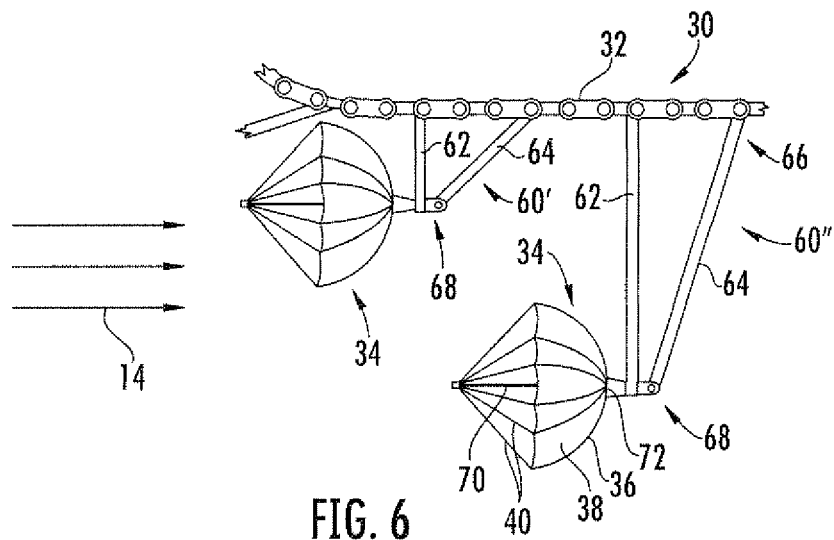
FIG. 6 is a side elevation view of a portion of a fluid-based power generation system, showing a catchment device in a leading configuration.

Each fluid catchment device 34 can be secured to the attachment arm 60 so that the fluid catchment device 34 can be open in the direction of flow 14 of the fluid (in this case, water) and closed in the opposite direction, that is, the direction opposite the direction of the fluid flow 14. There are various ways in which the catchment devices 34 can be attached to the attachment arm 60. For example, the catchment devices 34 can be connected to the attachment arms 60 in either a trailing configuration, as is shown in FIG. 5, or a leading configuration, as is shown in FIG. 6.

When the catchment devices 34 are configured as parachutes 36, a plurality of connection members, such as cords 40, can be connected to the attachment arm 60. The cords 40 can be made of any suitable material, including high strength fibrous materials such as carbon fibers. The cords 40 can hold the parachute canopy 38 in the open position when the water flow 14 reacts against the parachute 36. The force against the parachute 36 can be transmitted to the attachment 60 arm via the cords 40 which drives the continuous loop member 30.

In the trailing configuration, as depicted in FIG. 5, the cords 40 can be attached directly or indirectly to the attachment arm 60, such as at or near the distal end 68 thereof, or any other suitable structure. When the catchment devices 34 are in the open position, the attachment arms 60 can be upstream of the catchment device 34 relative to the direction of fluid flow 14. In a leading configuration, as depicted in FIG. 6, the attachment arms 60 can be downstream of the catchment device 34 relative to the direction of fluid flow 14 when the catchment devices are in the open position.

A central support rod 70 can be used to maintain the relative position of the apex 72 of the parachute 36, thereby preventing its orientation from being reversed when traveling upstream relative to the fluid flow 14. Referring to the trailing configuration in FIG. 5, one end of the central support rod 70 can be attached to the attachment arm 60, such as at or near the distal end 68. The central support rod 70 can extend from the attachment arm 60 at any suitable angle. In one embodiment, the central support rod 70 can extend at about 90 degrees relative to the first member 62 of the attachment arm 60. The other end of the central support rod 70 can be attached to the catchment device 34, such as at the apex 72 of the parachute 36. The central support rod 70 can pass through catchment device 34, such as the apex 72 of the parachute 36. The cords 40 of the catchment device 34 can be attached to the support rod 70 and/or the attachment arm 60. The force generated by the parachute 36 can be transmitted by the cords 40 to the central support rod 70, which can transfer that energy to the attachment arm 60.

In the leading configuration, as depicted in FIG. 6, one end of the central support rod 70 can be attached to the attachment arm 60, such as at or near the distal end 68. The central support rod 70 can extend from the attachment arm 60 at any suitable angle. In one embodiment, the central support rod 70 can extend at about 90 degrees relative to the first member 62 of the attachment arm 60. The other end of the central support rod 70 can be attached to the catchment device 34, such as at the apex 72 of the parachute. The central support rod 70 can pass through catchment device 34, such as the apex 72 of the parachute 36. The cords 40 can be attached to the support rod 70. The force generated by the parachute 36 can be transmitted by the cords 40 to the central support rod 70, which can transfer that energy to the attachment arm 60.

The attachment arms 60 can be sufficiently long to keep the catchment device 34 away from the continuous loop member 30 such that, when the catchment devices 34 are fully deployed (open) in the flow 14, the catchment devices 34 will not make contact with the continuous loop member 30. In some instances, the catchment devices 34 may be arranged in a staggered manner to increase the space between each other to improve efficiency in capturing flow. This arrangement can be achieved in various ways. For instance, relatively short attachment arms 60' can be provided in alternating relation with relatively long attachment arms 60" along at least a portion of the continuous chain 30, as is shown in FIG. 6.

Figure 10:
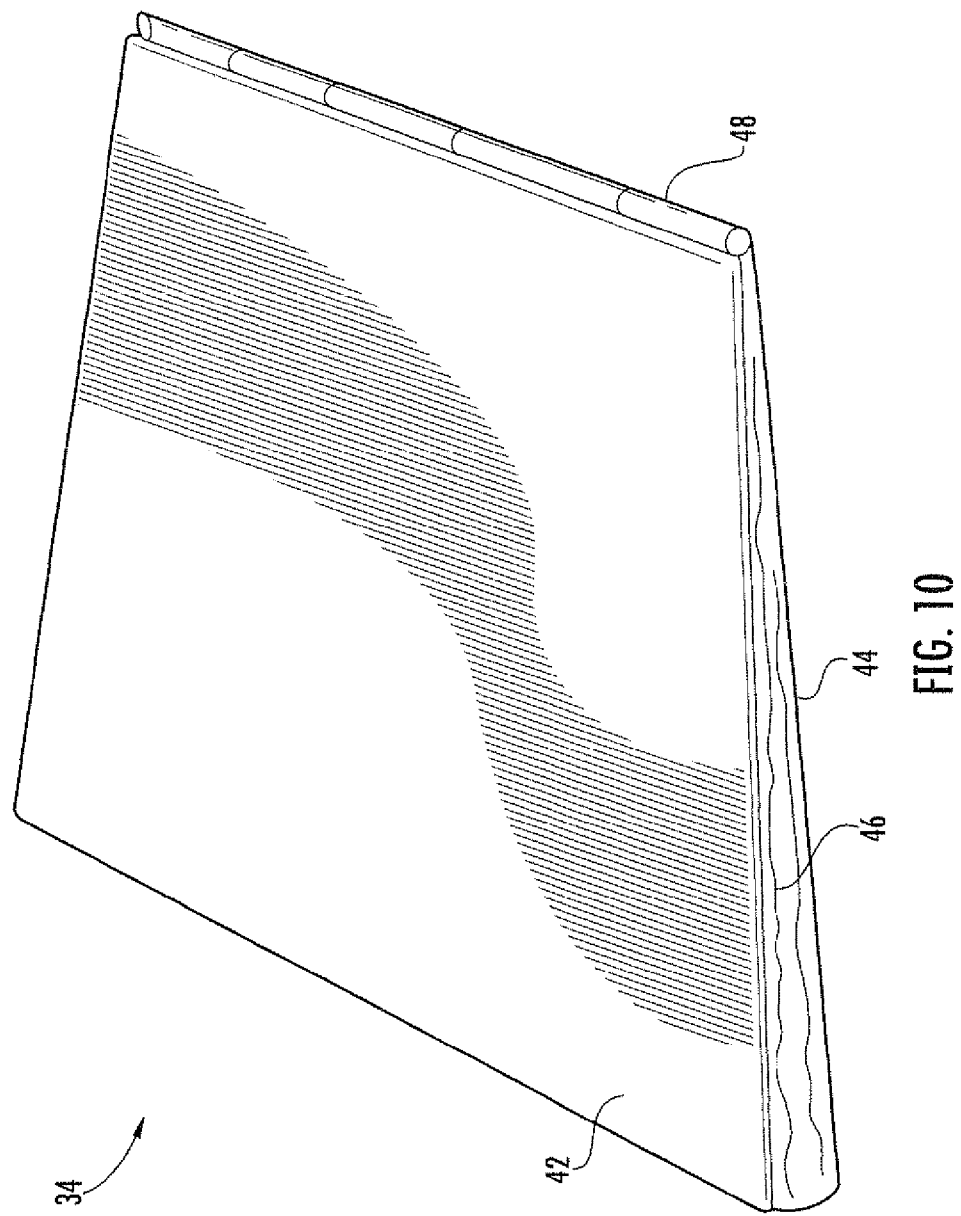
FIG. 10 is a perspective view of an alternative configuration of a catchment device, showing the device in a closed position.
Figure 11:
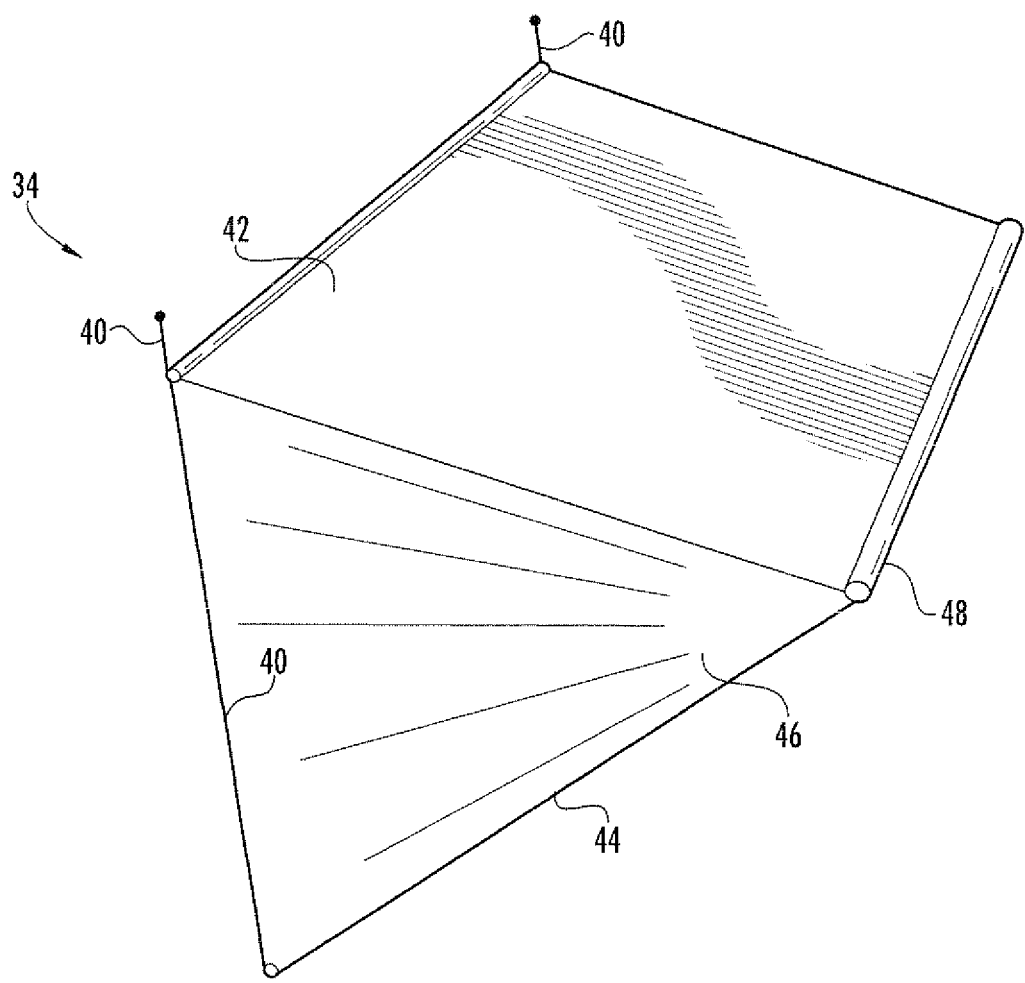
FIG. 11 is a perspective view of the catchment device of FIG. 10, showing the device in an open position.
Figure 12:
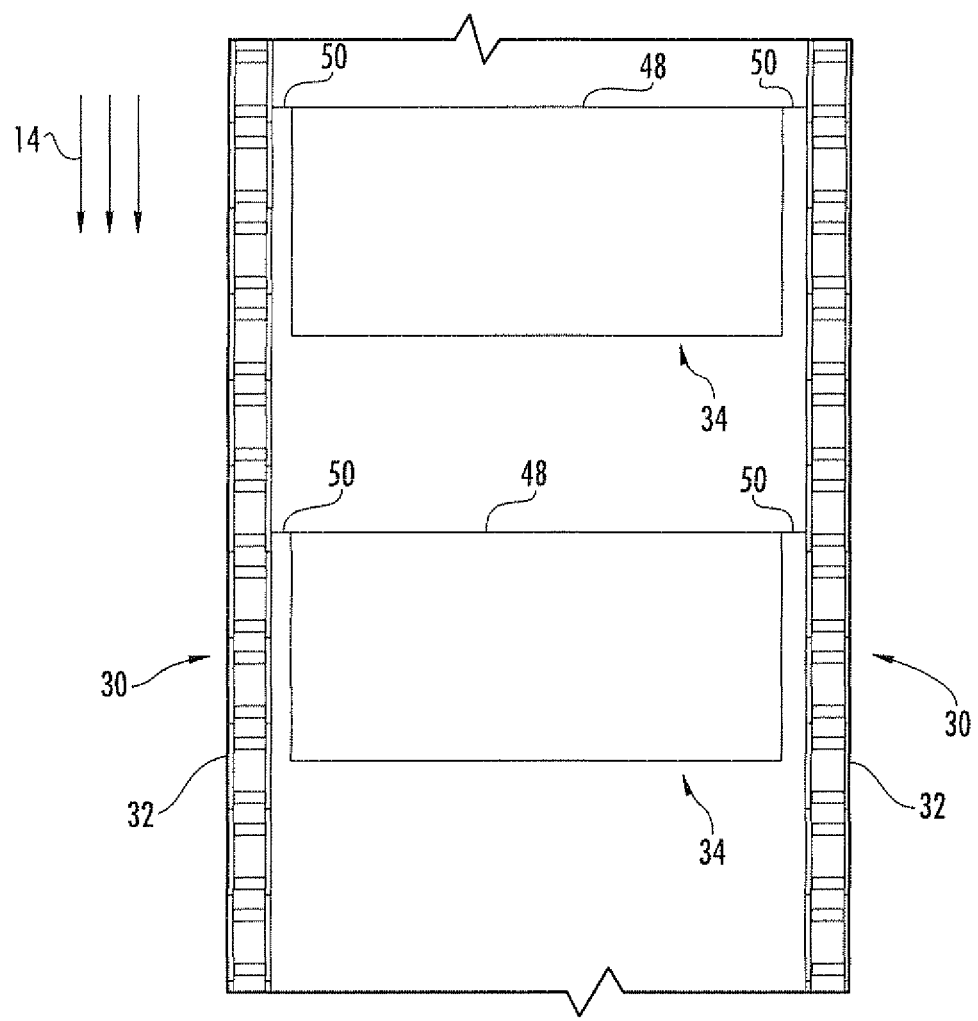
FIG. 12 is a top plan view of a fluid-based power generation system, showing a plurality of the catchment devices of FIG. 10 being attached between two continuous loop members.

The catchment devices 34 can have various shapes and configurations, and embodiments are not limited to any particular arrangement. FIGS. 10-12 show an alternative embodiment of a catchment device 34. The catchment device 34 can be configured as a clam-shell 35. In such case, the catchment device 34 can include a first wall 42 and a second wall 44. The catchment device 34 also includes expandable side walls 46. The first and second walls 42, 44 can be pivotally connected. For instance, in one embodiment, the catchment device 34 can include a first wall 42 and a second wall 44 connected at one end by a hinge 48 or other suitable structure. The first and second walls 42, 44 can be relatively hard such that their form is retained when immersed in the body of water 12 and subject to the flow 14. The catchment device 34 can include a closed position, as is shown in FIG. 10, and an open position, as is shown in FIG. 11.

Referring to FIG. 12, the clam-shell shaped catchment device 34 can be positioned between and operatively connected to two parallel continuous loop members 30. Such operative connection can be achieved in any suitable way. In one embodiment, the hinges 48 can be longer than the first and second walls 42, 44 such that a portion 50 of the hinge 48 protrudes beyond the end of each wall 42, 44. The protruding portions 50 can be directly or indirectly connected to the continuous loop member 30 in any suitable manner. The edge opposite of the hinged edge 48 can be attached to the loop member 30 by attachment cords, cable or other suitable attachment devices 40 to achieve the proper configuration to allow for proper rotation and deployment. An additional cord or cable 40 can retrain the walls 42, 44 to the proper width.

FIG. 2 shows an embodiment in which a plurality of fluid-based power generation systems 10 is employed. In such case, the systems 10 can be arranged in any suitable manner. FIG. 2 shows one example of the systems 10 being arranged in a parallel configuration. As shown, the systems 10 can be arranged such that the axes 23, 25 of the rotatable members 22, 24 are substantially vertical. However, the systems 10 can be arranged in any suitable manner. While only two systems 10 are shown, it will be understood that more than two systems 10 can be used. Each system 10 can be attached to a suitable structure to be supported in the flowing body of water 12. The plurality of systems 10 can be attached to the same structure, such as barge 16, or they can be attached to different structures.

The plurality of systems 10 can be arranged so that they rotate in opposite directions. That is, one of the systems 10 can be configured to rotate in a first rotational direction, and the other one of the systems 10 can be configured to rotate in a second rotational direction that is opposite the first direction, as is shown in FIG. 2. However, in other embodiments, the plurality of systems 10 can rotate in the same direction. The arrangement shown in FIG. 2 may be more stable in water than an embodiment that includes only a single system 10, such as the one shown in FIG. 1, because the moment force from one system 10, acting to twist the barge 16 or other support structure, would offset the moment force from the other system 10. While FIG. 2 shows two generators 18 operatively associated with each system, it will be appreciated that there can be more than two generators 18 driven by each system. Further, there can be more than one generator 18 operatively associated with at least one of the rotatable members 22, 24.

Figure 9:
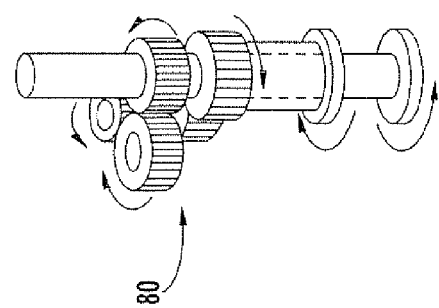
FIG. 9 is a perspective view of a mechanism that can allow connected rotatable members to rotate in opposite directions.
Figure 8:
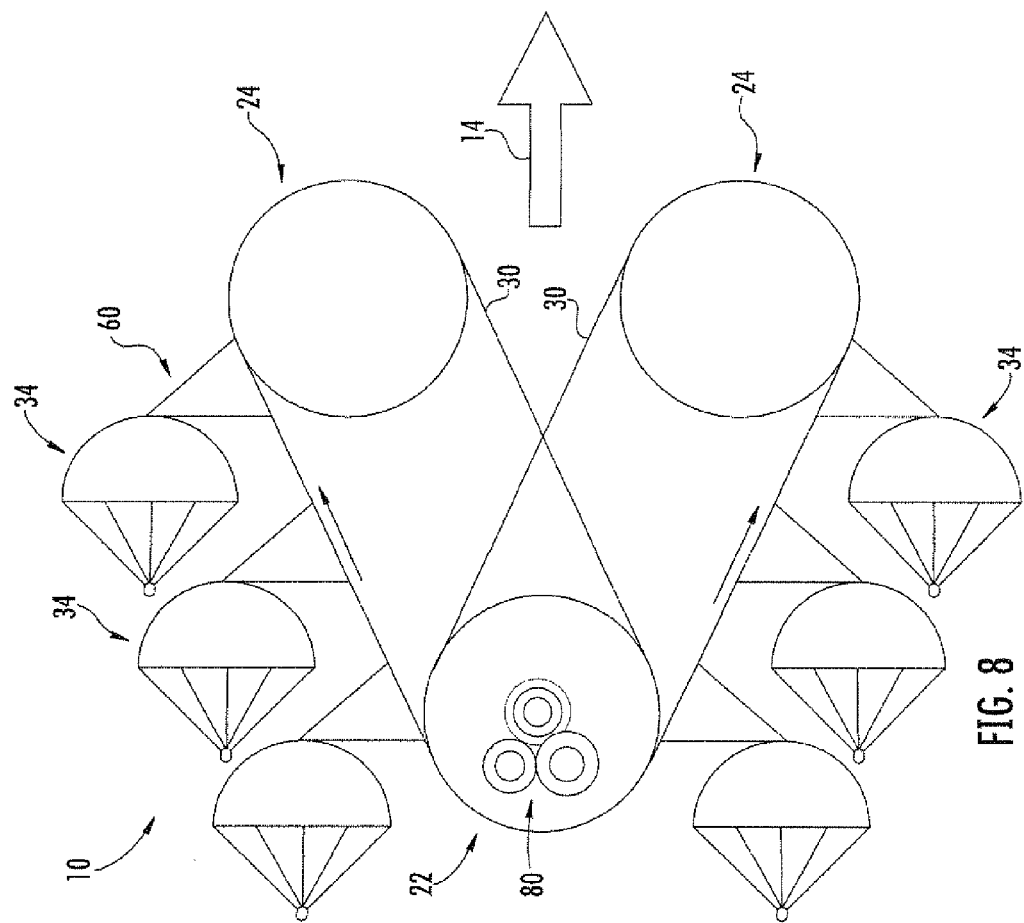
FIG. 8 is a top plan view of a fluid-based power generation system, showing a configuration in which a plurality of systems is arranged in a V-shaped configuration.

FIG. 8 shows another possible arrangement of a plurality of systems 10. Instead of a parallel arrangement, like as is shown in FIG. 2, the systems 10 can be angled relative to each other. Indeed, the systems 10 can have operatively connected forward rotatable members 22 such that a V-shaped configuration is formed. The connected forward rotatable members 22 can be adapted to rotate in opposite directions. To that end, a drive unit 78, which can comprise a plurality of gears 80, can be provided, as is shown in FIG. 9.

Figure 3:
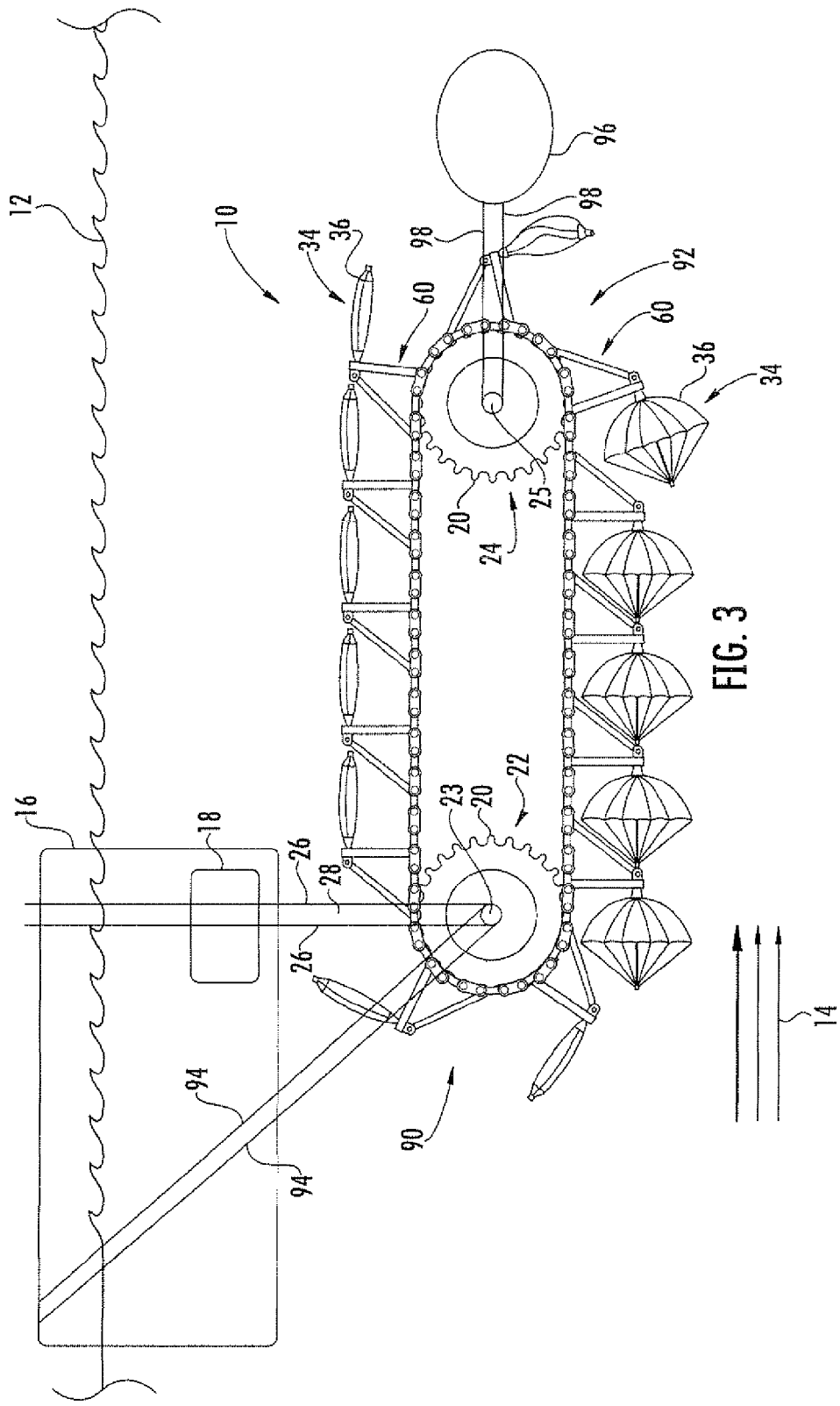
FIG. 3 is a side elevation view of a fluid-based power generation system, showing one end portion of the system as being associated with a barge and another end portion of the system being supported by a buoyant member.

FIG. 3 shows another embodiment of a manner of deploying a system 10. In this embodiment, only one end of the system 10 may be supported by the barge 16 or other support structure. For instance, a leading end portion 90 of the system 10, such as the forward rotatable member 22, can be operatively attached to the barge 16 by one or more lowering members 26. Additional support to the leading end portion 90 of the system 10 can be provided. For example, one or more support members 94 can be operatively attached to the leading end portion 90 of the system 10, such as the forward rotatable member 22, to the barge 16 or other support structure. The support members 94 can provide structural strength. The support members 94 can be deployed with the lowering members 26 or can be included subsequently. The support members 94 can be angled relative to the lowering members 26. In one embodiment, the support members 94 can be angled at less than about 90 degrees relative to the lowering members 26 and, more particularly, at about 45 degrees or less relative to the lowering members 26. The support members 94 can be any suitable structure and can be made of any appropriately strong material.

One or more buoyant members, such as a variable buoyancy buoy 96, can be used to support a trailing end portion 92 of the system 10. The variable buoyancy buoy 96 may also be used to help maintain proper alignment of the system 10 to the current flow 14. The variable buoyancy buoy 96 can be operatively connected to the trailing end portion 92 of the system 10, such as the aft rotatable member 24, by, for example, one or more support members 98. In some embodiments, an electric generator can be housed within the buoy.

Figure 4:
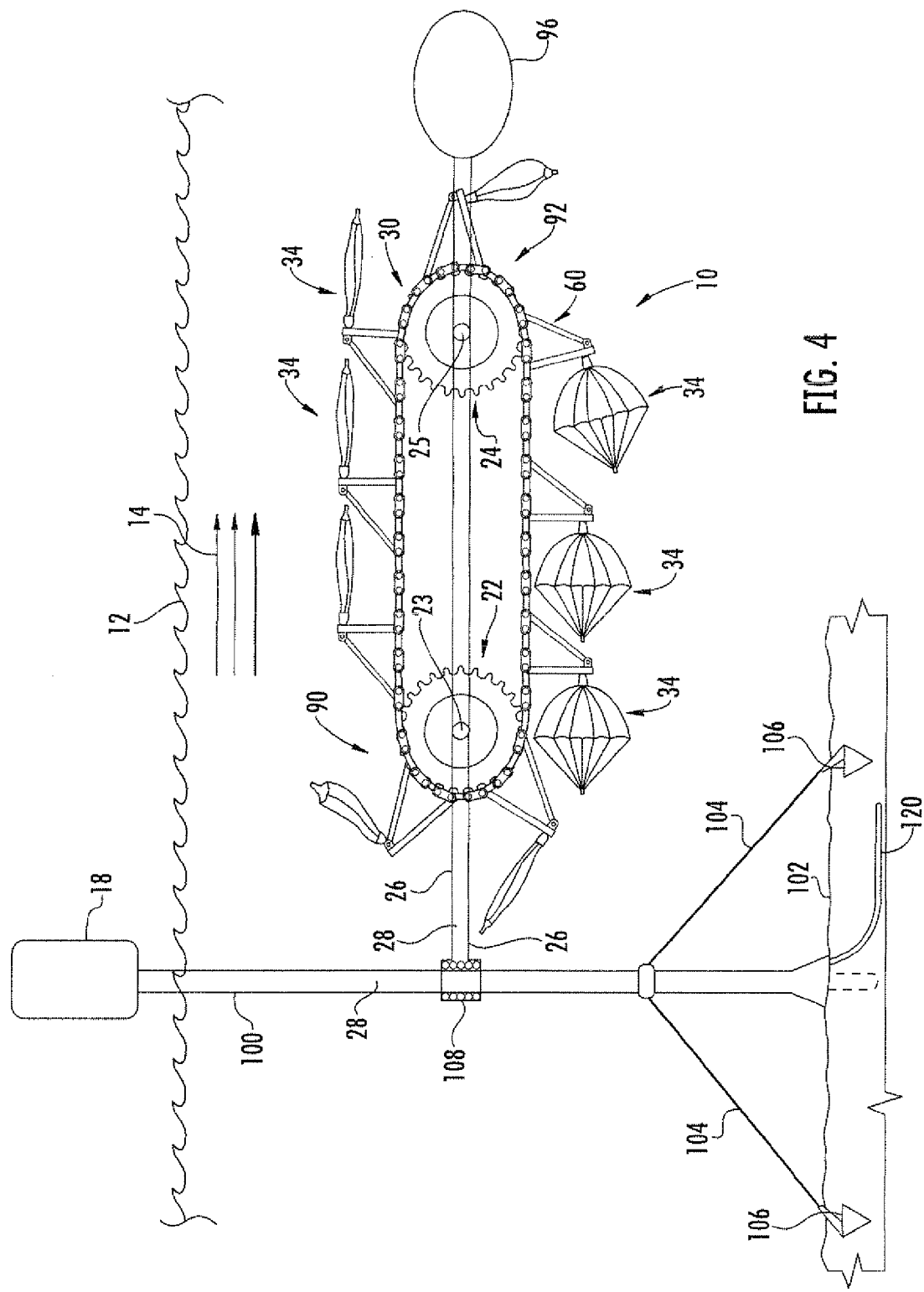
FIG. 4 is a side elevation view of a fluid-based power generation system, showing one end portion of the system as being operatively attached to a vertical shaft and another end portion of the system being supported by a buoyant member.

FIG. 4 shows another embodiment of a manner of deploying a system 10. Such an embodiment may be useful in an inlet setting. In such case, a shaft 100 or stanchion can be embedded in or otherwise mounted to the water body floor 102. Additional support for the shaft 100 can be provided by cables 104 and anchors 106 or other means. Any suitable number of cables 104 and anchors 106 can be used. In one embodiment, there can be at least three cables 104 and anchors 106. The generator 18 can be mounted on the shaft 100. The generator 18 can be housed within an enclosure (not shown), which can be hermetically sealed. A conductor, such as cable 120, can be operatively connected to receive electrical energy produced by the generator 18. A portion of the cable 120 can be housed within the vertical shaft 100. The cable 120 can exit at or near the bottom of the vertical shaft 100 and can extend therefrom to the shore. The cable 120 can be buried beneath the floor 102 of the body of water 12.

The lowering members 26 can operatively attach the shaft 100 to one end of the system 10, such as the leading end 90 of the system 10. The attachment of the lowering members 26 to the shaft 100 can be direct or indirect and can be achieved in any suitable manner. In one embodiment, the lowering members 26 can be attached to a rotatable ring 108. The ring 108 can rotate about the shaft 100 to accommodate changes in the direction of the flow 14. The ring 108 can have any suitable range of rotation on the shaft 100. For instance, the ring 108 can rotate 360 degrees on the shaft 100. However, a more restricted range of rotation may be possible. Further, the ring 108 can move vertically on the shaft 100. To that end, the ring 108 can include bearings to facilitate such movement. The trailing end 92 of the system 10 can be at least partially supported by a buoyant member, such as a variable buoyancy buoy 96. A generator (not shown) can be housed within the buoyant member.

Figure 7:
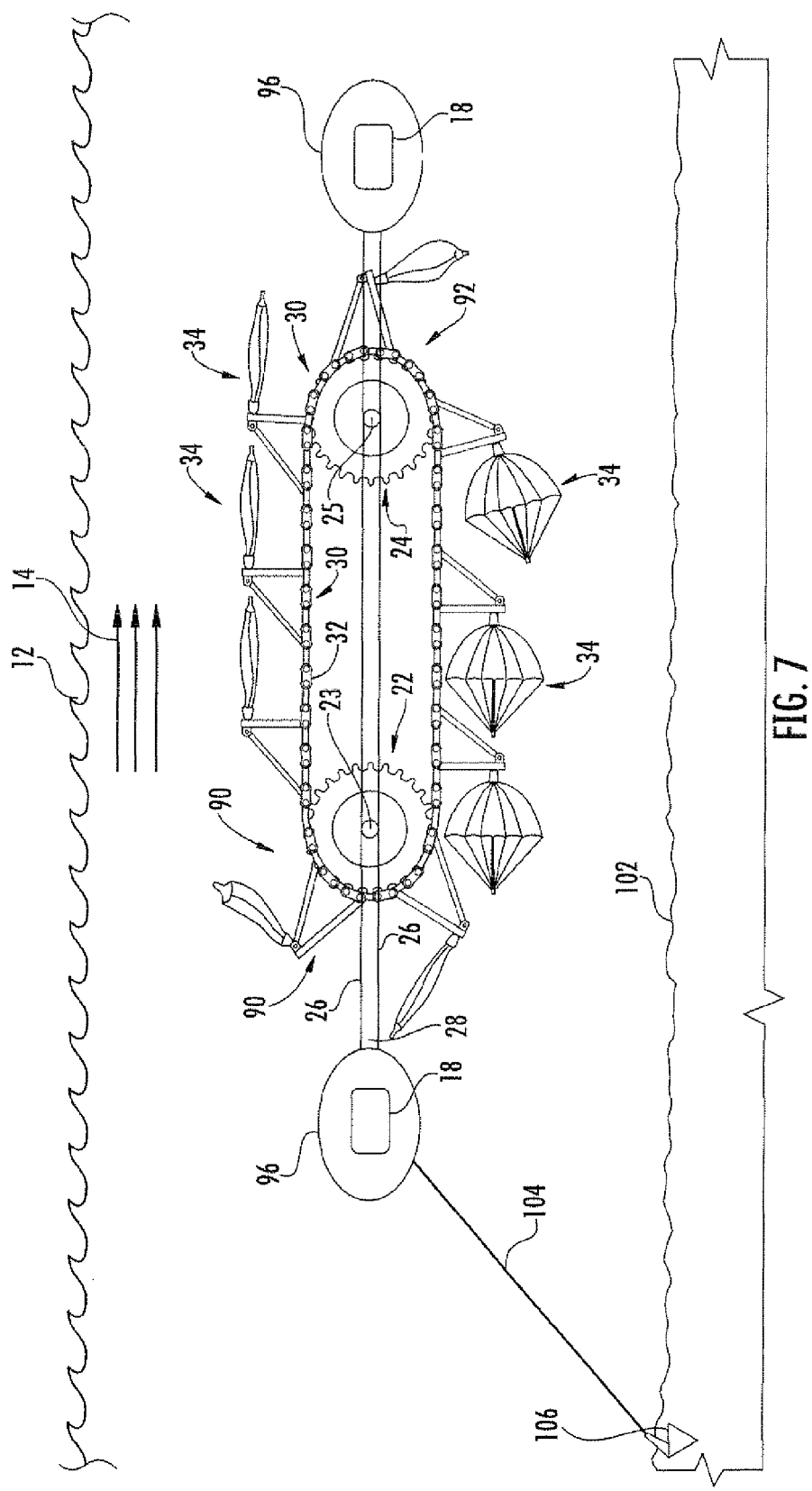
FIG. 7 is a side elevation view a fluid-based power generation system, showing the end portions of the system being supported by buoyant members.

FIG. 7 shows another embodiment of a manner of deploying a system 10. In this arrangement, a plurality of buoyant members is used to support the system 10 in the body of water 12. At least one buoyant member can be provided to support the leading end portion 90 of the system 10, and at least one other buoyant member can be provided to support the trailing end portion 92 of the system 10. The buoyant members can be attached to the system in any suitable manner. For instance, the buoyant members can be attached to the rotatable members 22, 24 by members 26. The buoyant members can be variable buoyancy buoys 96.

At least one of the buoys can be tethered to the floor 102 of the body of water 12 using cables 104, anchors 106 and/or other suitable structure. In this arrangement, the generators 18 can be provided within the buoyant members, such as in a hermetically sealed compartment. A drive shaft 28 can operatively connect the rotatable members 22, 24 to the generators 18 in any suitable manner, including in any way described herein. A drive shaft 28 can be contained within the lowering member 26. This drive shaft 28 can interface with a drive shaft 28 housed within the vertical shaft 100, such as by a worm gear drive. In this way the rotation of the rotatable members 22, 24 can be transmitted to the generator 18. It will be appreciated that this arrangement can eliminate the need for the barge or other support structure.

FIG. 13 shows another manner of deploying a system 10. In this arrangement, one or more systems 10 can be deployed off of a barge. The leading end portion 90 of each system 10 can be supported by any suitable structure, such as arm 130. The arm 130 can be pivotable at one or more points. The system 10 can be arranged such that the axes 23, 25 of the rotatable members 22, 24 extend substantially vertically. However, other orientations are possible. In instances in which a plurality of systems 10 is used, the systems 10 can be arranged at different depths in the body of water, as is shown in FIG. 13. In addition, at least a portion of an underside 132 of the system 10 can be supported in any suitable manner, including, for example, by a buoyant platform 134 or other buoyant member. The buoyancy of the platform 134 can be varied. The generator 18 can be mounted or otherwise provided on one of the systems 10.

Figure 14:
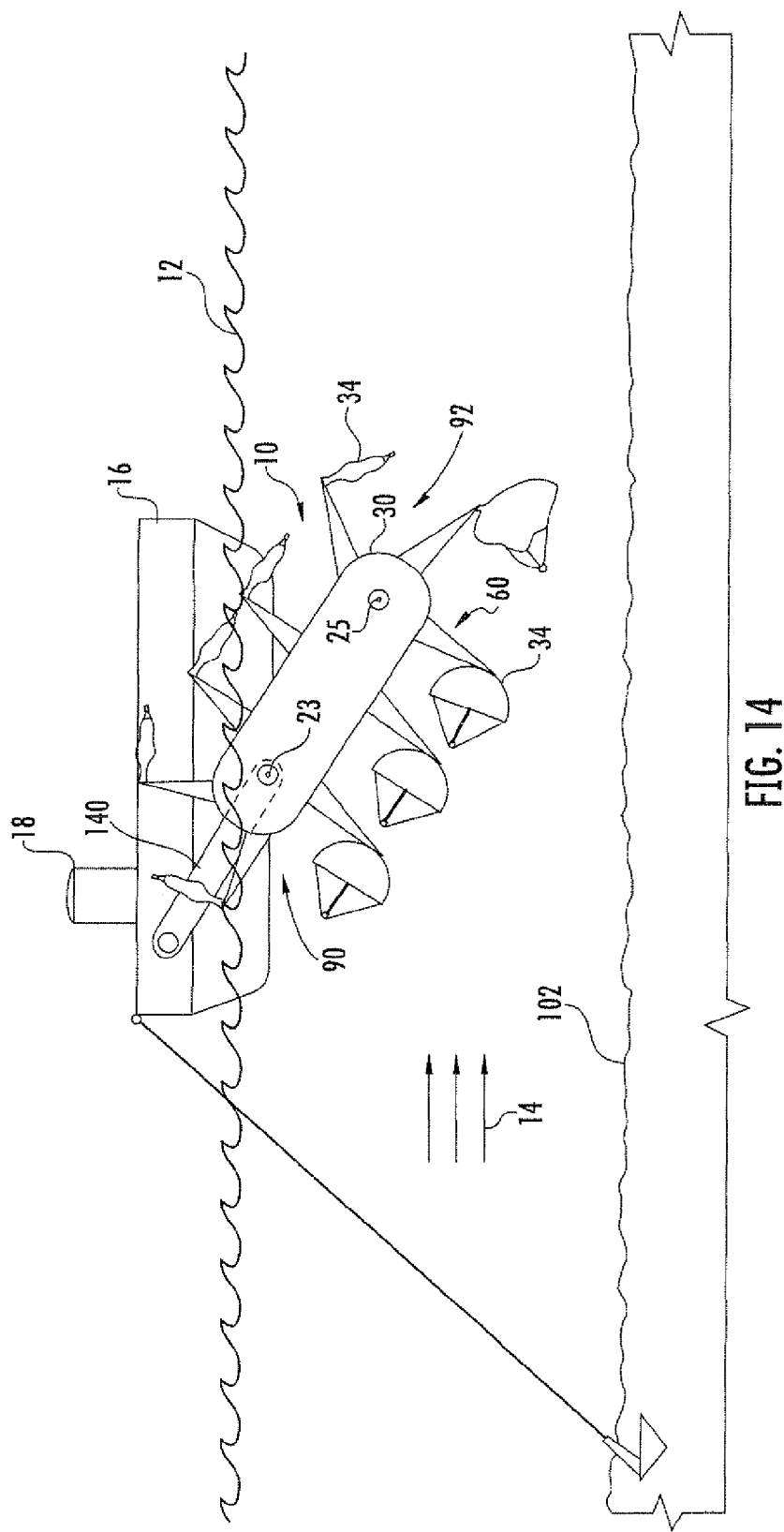
FIG. 14 is a side elevation view a fluid-based power generation system, showing the system being deployed off of a barge and being angled relative to the flow.
Figure 15:
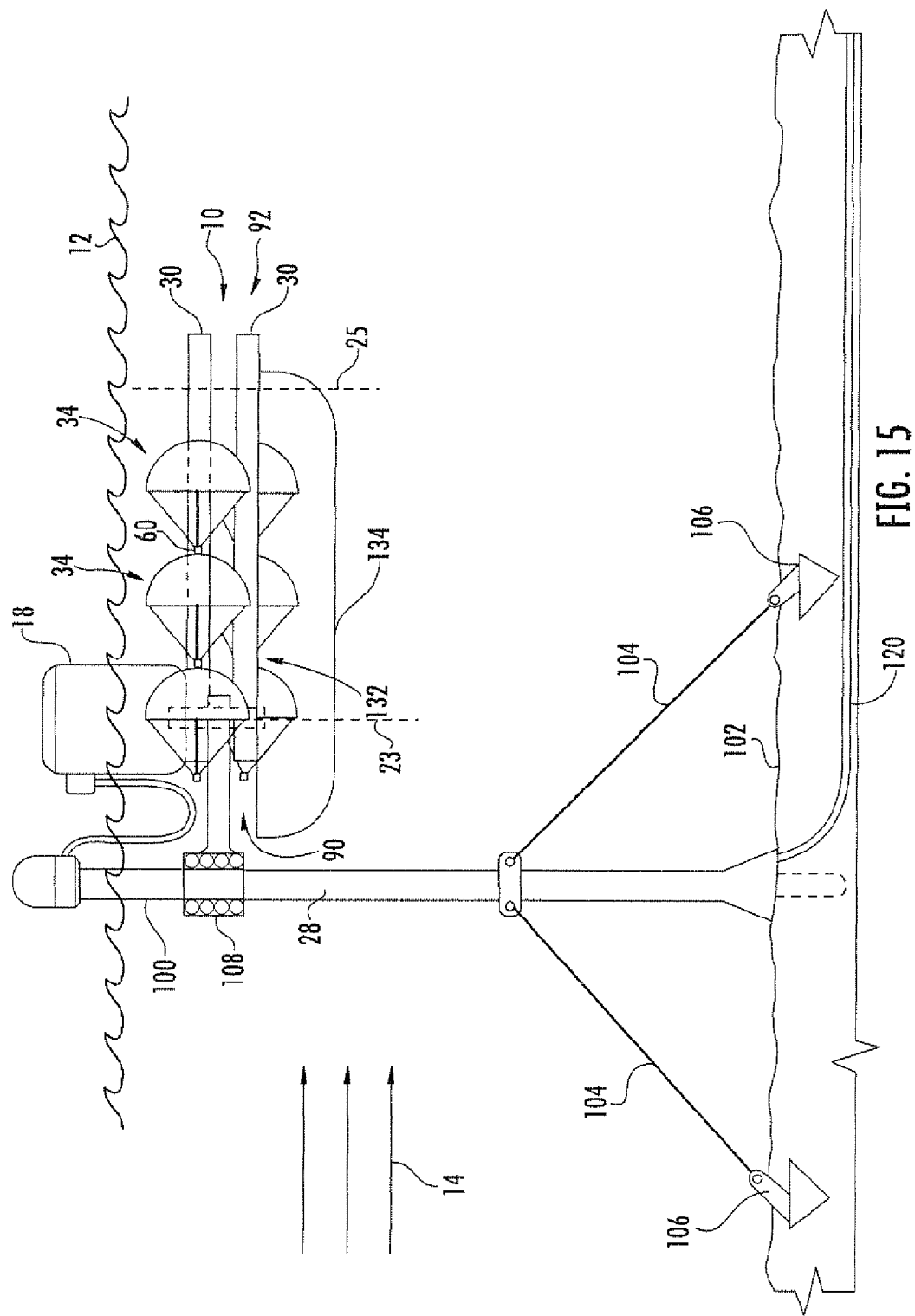
FIG. 15 is a side elevation view a fluid-based power generation system, showing one end of the system as being operatively attached to a vertical shaft and an underside of the system being supported by a buoyant member.

FIG. 14 shows another embodiment of a manner of deploying a system 10. In this arrangement, one or more systems 10 can be deployed off of a barge 16. The leading end portion 90 of each system 10 can be supported by any suitable structure, such as arm 140. The system 10 can extend cantilevered from the arm 140 such that the aft end portion 92 of the system 10 is not supported. The system 10 can be arranged so that it is angled relative to the direction of the flow 14, as is shown. Any suitable angle can be used, and the angle may be varied as needed. A portion of the barge 16 can be anchored to the floor 102 of the body of water 12. The generator 18 can be mounted or otherwise provided on the barge 16.

FIG. 15 shows another embodiment of a manner of deploying a system 10. This embodiment includes some similarities to the embodiment shown in FIG. 4, and the relevant discussion in connection with FIG. 4 is applicable to this embodiment. However, some of the possible differences will be described here. The generator 18 can be mounted on the shaft 100, or it can be mounted on a portion of the system 10, as is shown. The system 10 can be arranged such that the axes 23, 25 of the rotatable members 22, 24 extend substantially vertically. In addition, at least a portion of an underside 132 of the system 10 can be supported in any suitable manner, including, for example, by a buoyant platform 134 or other buoyant member. The buoyancy of the platform 134 can be varied.

It should be noted that various combinations of the above-described arrangements can be used. Embodiments are not limited to the specific examples shown herein. For instance, multiple drives can be connected. For example two loop members 30 can be used and are each can operatively engage a forward rotatable member 22 and an aft rotatable member 24. The two forward rotatable members 22 can be connected by a common rotor shaft (not shown) so that the two forward rotatable members 22 rotate together. The two rear rotatable members 24 can also be connected together by a common rotor shaft (not shown) so that they rotate together. Each of the two loop members 30 can support a plurality of catchment devices 34. In other embodiments, more than two loop members 30 can be rotatably supported between the sets of forward rotatable members 22 and the sets of rearward rotatable members 24 so that more than two parallel sets of catchment devices 34 can be used to drive the generator or generators.

Having described various components and arrangements of the systems 10, one manner of the operation of a system 10 will now be described. With the system 10 placed in the fluid flow 14, the flowing fluid can react with the fluid catchment devices 34 located on a section of the continuous loop member 30 that is moving in the direction of the flow 14 so that the catchment devices 34 are inflated, deployed or otherwise opened. The cords 40 that connect to the ends of the catchment device 34 can allow for the proper shape of the catchment device 34 to be formed so that the maximum reaction of the fluid flow 14 to the catchment device 34 will result in the maximum force being transmitted to the continuous loop member 30 through the cords 40 and the attachment arm 60. The opened catchment devices 34 will thus drive the continuous loop member 30. The rotation of the continuous loop member 30 can be transmitted to the rotatable members 22, 24 that, in turn, drive the shafts 28 that drive the electric generator 18. The electric generator 18 produces electrical energy, which can be used for any suitable application. It will be appreciated that if the catchment devices 34 are provided in a staggered arrangement, such as the one shown in FIG. 6, the catchment devices 34 will not block the flow in the catchment device 34 located immediately downstream thereof, thereby maximizing extraction of energy from the flow 14.

As the opened catchment devices 34 pass around the aft rotatable member 24, the opened catchment device 34 will collapse to a closed position as it encounters the force of the flow 14 in the opposite direction. When collapsed, drag on the catchment device 34 is reduced as it passes along the section of continuous loop member 30 that moves in a direction opposite to the direction of the fluid flow 14. When the catchment device 34 is a parachute 36, the central rod 70 can support the collapsed parachute 36 so that the parachute 36 will flow against the fluid flow without unfurling. As the collapsed catchment device 34 passes around the forward rotatable member 22, the catchment device 34 will open as the fluid flow 14 reacts with it. Because the catchment devices 34 are connected to the attachment arms 60, the catchment devices 34 are spaced from the continuous loop member 30 and do not contact the continuous loop member 30 nor do they contact the rotatable members 22, 24 as the catchment device 34 round the rotatable members. Thus, by avoiding such contact, damage to the catchment devices 34 is minimized. Further, by having the catchment devices 34 spaced away from the continuous loop member 30, the catchment devices 34 are better able to react with the fluid flow 14.

Thus, it will be appreciated that the systems described herein can capture and convert linear flow energy in an ocean current or waterway into rotational power that can be used to drive electric generators and many other applications. The systems can maximize the energy extraction from the moving fluid. Indeed, it will be appreciated that by providing the attachment arms, the size of the catchment devices—and therefore the amount of reaction force produced on the catchment devices—can be maximized, allowing much more energy to be extracted from the flowing fluid. The potential for generating power is enormous. Significantly, there is no pollution created and the power source is free. Further, the system does not require mining or drilling to access it. The system can operate continuously.

Additionally, it will be appreciated that the system described herein can be efficiently and cost-effectively assembled and disassembled and can be scaled to different sizes without changing the basic design. Thus, the system can enable fast, efficient and cost effective deployment in many locations. Indeed, the system can be adapted to a wide variety of waterway sizes and locations. Likewise, the system can be removed or repair in an efficient and cost-effective manner. The parts of the system can be standardized and modular, thereby significantly reducing design time and costs, construction costs, and maintenance and repair costs.

Significantly, the system can operate in a non-intrusive manner in the environment in which it is located. The system will not appreciably disrupt or alter the natural flow of the fluid in which it is located. Thus, the impact of the system on the aquatic environment as well as the land environment is negligent. The system will not appreciably inhibit the flow of vehicular or water traffic near the device. Further, if a waterway is too narrow to accommodate the system without disrupting waterway traffic, a diversion canal can be created in which the system can be placed thereby not altering the original utilization of the waterway.

However, the embodiments presented herein avoid many of the negative aspects associated with prior devices. The amount of energy that could be generated from the Gulf Stream, ocean inlets, tidal waters, rivers and streams is an enormous power source that is virtually untapped when compared to its potential. Next, the system described herein can be easily assembled and disassembled and can be scaled to different sizes without changing the basic design, thereby enabling fast, efficient and cost effective deployed in many locations. The ability of the system to produce large amounts of power from the movement of water without disrupting or altering the flow and its associated environments makes it preferable to other methods.

The foregoing description is provided in the context of one possible application for embodiments of a fluid-based power generation system. While the above description is made in the context of a water-based power generation system, it will be understood that the systems can be used in connection with any suitable fluid, including, for example, air. Further, while embodiments have been described herein in connection with hydro-electric power, it should however be noted that the systems described herein are able to produce efficient hydro-mechanical energy, such as driving fluid or pneumatic pumps. Thus, it will of course be understood that the embodiments are not limited to the specific details described herein, which are given by way of example only, and that various modifications and alterations are possible within the scope of the following claims.

What is claimed is:

1. A power generating system comprising:
    a continuous loop member;
    a forward rotatable member supporting a portion of the loop member;
    an aft rotatable member supporting another portion of the loop member;

a plurality of attachment arms distributed along the loop member, each attachment arm having a proximal end attached to the loop member and extending outwardly therefrom to a distal end; and a plurality of fluid catchment devices, each catchment device being operatively connected to a respective one of the plurality of attachment arms, such that each catchment device is spaced from the loop member, each catchment device including an open position and a closed position, whereby the catchment devices reacts with a fluid flow to open in the direction of the fluid flow to thereby transmit energy from the fluid flow to drive the loop member, and whereby the catchment devices collapse to the closed position in the direction opposite to the fluid flow to significantly reduce drag, further including a support rod, wherein one end of the support rod is connected to the attachment arm in a distal end region thereof and extends therefrom, wherein the other end of the support rod engages a portion of a respective one of the catchment devices, wherein the catchment devices are parachutes having a canopy and a plurality of connectors attached to and extending from an end of the canopy, wherein the connectors are further attached to one of the attachment arm and the support rod.

2. The power generating system of claim 1, wherein the support rod is attached to a central portion of the parachute canopy.

3. The power generating system of claim 1, wherein each attachment arm has a length such that, when the catchment devices are in the open position, the catchment devices do not contact the loop member.

4. The power generating system of claim 1, wherein the plurality of attachment arms are distributed along the entire length of the loop member.

5. The power generating system of claim 1, wherein at least one of the rotatable members is supported by operatively connection to a barge.

6. The power generating system of claim 1, wherein at least one of the rotatable members is supported by a buoyant member.

7. The power generating system of claim 6, wherein a generator is housed within a buoyant member.

8. The power generating system of claim 6, wherein the buoyant member has variable buoyancy.

9. The power generating system of claim 1, wherein at least a portion of the system is supported by a buoyant member.

10. The power generating system of claim 1, wherein at least a portion of the system is operatively connected to a substantially vertical shaft.

11. The power generating system of claim 10, wherein the system is at least one of rotatable about the shaft and vertically movable along the shaft.

12. The power generating system of claim 1, wherein the forward rotatable member is operatively connected to an electric generator, whereby motion of the forward rotatable member is transmitted to the electric generator to produce electrical energy, and wherein the aft rotatable member is operatively connected to an electric generator, whereby motion of the aft rotatable member is transmitted to the electric generator to produce electrical energy.

13. The power generating system of claim 1, wherein the forward rotatable member has an associated axis of rotation and the aft rotatable member has an associated axis of rotation, wherein the axes of rotatable members are substantially horizontal.

14. The power generating system of claim 1, wherein the forward rotatable member has an associated axis of rotation and the aft rotatable member has an associated axis of rotation, wherein the axes of rotatable members are substantially vertical.

15. The power generating system of claim 1, wherein at least one of the catchment devices is configured as a clam shell.

16. The power generating device of claim 1, wherein at least one of the attachment arms includes a first member, wherein the first member has a proximal end attached to the loop member and extends substantially perpendicular therefrom in a section of the loop member between the forward and aft rotatable members, and wherein the first member has a distal end.

17. A power generating system comprising:
a continuous loop member;
a forward rotatable member supporting a portion of the loop member;
an aft rotatable member supporting another portion of the loop member;
a plurality of attachment arms distributed along the loop member, each attachment arm having a proximal end attached to the loop member and extending outwardly therefrom to a distal end; and
a plurality of fluid catchment devices, each catchment device being operatively connected to a respective one of the attachment arms or the support rods such that each catchment device is spaced from the loop member, each catchment device including an open position and a closed position, whereby the catchment devices reacts with a fluid flow to open in the direction of the fluid flow to thereby transmit energy from the fluid flow to drive the loop member, and whereby the catchment devices collapse to the closed position in the direction opposite to the fluid flow to significantly reduce drag,
wherein a first subset of the plurality of attachment arms have an associated first length and a second subset of the plurality of attachment arms have an associated second length, wherein the first length is different from the second length, wherein the attachment arms of the first length alternate with the attachment arms of the second length along the loop member.

18. The power generating device of claim 16, wherein the at least one of the attachment arms includes a second member, wherein the second member has a proximal end attached to the loop member and a distal end attached to the distal end of the first member, whereby the second member provides support against bending to the first member.

19. A power generating system comprising:
a first system; and
a second system,
wherein each of the first and second systems include:
a continuous loop member;
a forward rotatable member supporting a portion of the loop member;
an aft rotatable member supporting another portion of the loop member;
a plurality of attachment arms distributed along the loop member, each attachment arm having a proximal end attached to the loop member and extending outwardly therefrom to a distal end; and
a plurality of fluid catchment devices, each catchment device being operatively connected to a respective one of the plurality of attachment arms, such that each catchment device is spaced from the loop member the catchment device including an open position and a closed position, whereby the catchment device reacts with a fluid flow to open in the direction of the fluid flow to thereby transmit energy from the fluid flow to drive the loop member, and whereby the catchment devices collapse to the closed position in the direction opposite to the fluid flow to significantly reduce drag, wherein the first and second systems are arranged in a substantially v-shaped configuration, wherein the forward rotatable member of the first system is operatively connected to the forward rotatable member of the second system, wherein the forward rotatable member of the first system rotates in an opposite direction to the forward rotatable member of the second system.

20. The power generating device of claim 19, wherein the first and second systems are substantially parallel to each other.

21. The power generating device of claim 19, wherein the first and second systems are disposed at different vertical elevations.

\* \* \* \* \*